United States Patent [19]

Hellstern et al.

[11] Patent Number: 5,174,315
[45] Date of Patent: Dec. 29, 1992

[54] SYSTEM FOR CLEANING OBJECTS

[75] Inventors: Rüdiger K. Hellstern, Stuttgart; Peter M. Hösel, Pforzheim; Arwed Eberle, Reutlingen; Ulrich Lachenmayer, Uhingen; Herbert Kohler, Kornwestheim, all of Fed. Rep. of Germany

[73] Assignee: Durr GmbH, Stuttgart, Fed. Rep. of Germany

[21] Appl. No.: 684,787

[22] Filed: Apr. 12, 1991

[30] Foreign Application Priority Data

Apr. 13, 1990 [DE] Fed. Rep. of Germany ....... 4012022

[51] Int. Cl.⁵ .................................................. B08B 3/10
[52] U.S. Cl. ........................................ 134/60; 134/107; 134/108
[58] Field of Search .................. 134/60, 107, 108, 109; 68/18 R, 18 C, 18 F; 210/167

[56] References Cited

U.S. PATENT DOCUMENTS

| | | | |
|---|---|---|---|
| 2,142,726 | 1/1939 | Hetzer | 210/167 X |
| 2,270,642 | 1/1942 | Somes | 134/109 X |
| 2,359,088 | 9/1944 | Croft | 134/60 X |
| 2,721,562 | 10/1955 | Irvine | 134/60 |
| 2,949,119 | 8/1960 | Smith | 134/108 X |
| 4,879,888 | 11/1989 | Suissa | 210/167 X |

FOREIGN PATENT DOCUMENTS

| | | | |
|---|---|---|---|
| 0093264 | 11/1983 | European Pat. Off. | 134/109 |
| 394745 | 1/1974 | U.S.S.R. | 134/60 |

*Primary Examiner*—Philip R. Coe
*Attorney, Agent, or Firm*—Flynn, Thiel, Boutell & Tanis

[57] ABSTRACT

Method for cleaning objects with the aid of an aqueous cleaning fluid containing a washing agent, in which the objects are rinsed with an aqueous rinsing fluid after treatment with the cleaning fluid and wherein, to avoid any components having a low boiling point being returned to the cleaning and rinsing fluid as well as to avoid any loss in washing agents, the cleaning fluid is first subjected to membrane filtration, the permeate hereby recovered and containing washing agents is distilled, the concentrate resulting therefrom and containing washing agents is added to the cleaning fluid used in the cleaning process and the distillate is supplied to the rinsing process.

9 Claims, 1 Drawing Sheet

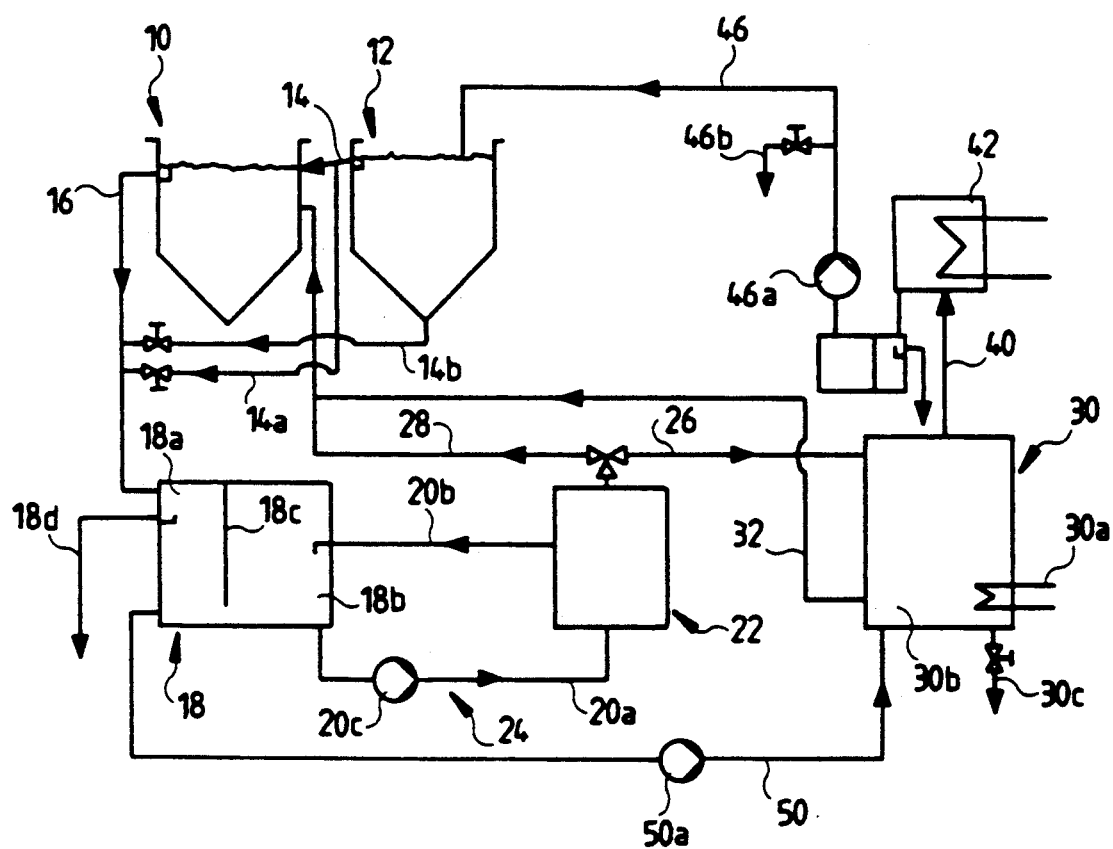
FIGURE

SYSTEM FOR CLEANING OBJECTS

BACKGROUND OF THE INVENTION

The invention relates to a method for cleaning objects, such as workpieces just used for machining, which have been soiled, in particular, by oily or greasy impurities, with the aid of an aqueous cleaning fluid containing at least one washing agent. In this method, the objects are rinsed after treatment with the cleaning fluid with an aqueous rinsing fluid, in particular with water which is as pure as possible, and a distillate is recovered from cleaning and/or rinsing fluid following preliminary cleaning by distillation in a vaporizer and this distillate is fed back. In addition, the invention relates to a system for performing a method of this type, comprising at least one cleaning apparatus, one rinsing apparatus and one vaporizer, the cleaning apparatus being connected with the vaporizer via a cleaning fluid line and a precleaning apparatus for transferring cleaning fluid to the vaporizer and the vaporizer having a distillate line serving to feed back the distillate.

Washing agents are intended to be understood in the following as substances such as detergents and other washing agents in the narrow sense, but also organic solvents.

The Dürr GmbH has already sold a system of the aforementioned type, in which the objects to be cleaned pass one after the other through two cleaning baths as well as a plurality of subsequent rinsing baths. Only completely desalinated water is supplied to the last two of a total of four rinsing baths while an overflow of the third rinsing bath is connected with the second rinsing bath and an overflow of the latter with the first rinsing bath. Moreover, an overflow of the first rinsing bath is connected with the second cleaning bath and an overflow of the latter with the first cleaning bath. An overflow from the first cleaning bath leads to an oil separator, and a rinsing fluid supply line branches off the overflow of the first rinsing bath. This supply line is provided with a valve and also leads to the oil separator. A discharge line leads from a clean fluid region of the oil separator to the vaporizer, from which a vapor and distillate line leads first of all to heat exchangers in the various cleaning and rinsing baths and then to a condensate collecting tank, from where the distillate is conveyed by a pump into the second rinsing bath. The baths are therefore heated with the vapor or distillate. Since the oil separator cannot completely prevent oily impurities passing into the vaporizer from the cleaning and rinsing baths, and since in this way washing agents are also supplied to the vaporizer, this known system has two disadvantages: Since there is no transition of detergents and the like into the vapor phase in the vaporizer, whereas this is the case for components of machining oils having a low boiling point and other substances which pass over into the vapor phase with the water vapor, the washing agents passing into the vaporizer are lost and the impurities contained in the distillate are a disturbance in the first two rinsing baths which are supplied from the condensate collecting tank.

SUMMARY OF THE INVENTION

The object underlying the invention was to improve the first known method described above and the known system for performing this method such that the specified disadvantages are at least clearly diminished.

Proceeding on the basis of a method of the type specified at the outset, this object may be accomplished in accordance with the invention in that the fluid to be fed to the vaporizer is subjected beforehand to a membrane filtration, the permeate thereby recovered is at least partially distilled, the distillate is at least partially added to the rinsing fluid used in the rinsing process and the concentrate resulting during distillation is at least partially added to the cleaning fluid used in the cleaning process. Since components having a higher molecular concentration and oils having a low boiling point, as well, cannot pass through a filter membrane, such as that known for the so-called microfiltration or ultrafiltration, impurities contained in the rinsing and/or cleaning fluid, which would be converted into the vapor phase, are prevented in this way from passing into the vaporizer. The vapor generated in the vaporizer and, with it, the condensate added to the rinsing fluid do not, therefore, contain any such impurities. Due to the fact that the concentrate which results during distillation of the permeate recovered due to the membrane filtration is added at least partially to the cleaning fluid used in the cleaning process, the washing agents passing into the vaporizer will not be lost for the cleaning process.

It is, in fact, known from DE-AS 23 30 200 to subject the cleaning fluid which is used in a cleaning apparatus and contains aqueous, washing agents, to an ultrafiltration with the aid of a membrane filter apparatus and to add the permeate containing the washing agents to the cleaning fluid again. In the system according to this state of the art, cleaning fluid is drawn off from a cleaning apparatus and supplied to a cleaning fluid collecting tank which is joined to the membrane filter apparatus via a feed and a return line to form a circuit including a pump. A permeate line then leads directly from the membrane filter apparatus to the cleaning apparatus. This state of the art could not, however, anticipate the inventive method since, on the one hand, the permeate resulting from membrane filtration is, in this known method, fed directly to the cleaning apparatus again and because, on the other hand, a membrane filtration for processing rinsing fluids is unsuitable in this respect because washing agents cannot be retained during membrane filtration. In the inventive method cleaning and rinsing fluids are, in particular, to be processed together.

In order, first of all, to separate from the fluid to be processed the major amount of the oil washed from the cleaned objects, it is recommended that the cleaning and/or rinsing fluid to be fed to the vaporizer be collected prior to the membrane filtration in an oil separator and the fluid precleaned in this manner be circulated in a circuit and simultaneously subjected to membrane filtration. This means that the oil separator not only takes over the function of precleaning but also serves as collecting tank for the fluid to be subjected to membrane filtration during circulation in the circuit.

If a high rate of regeneration of the cleaning fluid used in the cleaning process is to be achieved, it is recommended that part of the permeate resulting during membrane filtration, including the washing agents contained therein, be added directly to the cleaning fluid used in the cleaning process and this part of the permeate not be distilled. In this way, the energy costs for the inventive method can be reduced since it is unnecessary to vaporize the entire permeate.

As in the first known method described, it is also advantageous in the inventive method for the cleaning fluid used in the cleaning process and/or the rinsing fluid used in the rinsing process to be heated by the heat recovered during condensing of the distillate. The cleaning and rinsing fluids are considerably more effective when they are allowed to act on the objects to be cleaned or rinsed in their heated state.

The cleaning fluid to be processed and/or the rinsing fluid to be processed could be drawn off separately from the cleaning apparatus and the rinsing apparatus, respectively, and subjected to membrane filtration. So that, however, the rinsing and cleaning fluids used are always as pure as possible, it is of advantage, as in the first known method described above, for rinsing fluid to be drawn off from the rinsing process, according to the amount of distillate added to the rinsing fluid, and added to the cleaning fluid. As this will reduce the concentration of the washing agents in the cleaning fluid used in the cleaning process, it is of particular advantage when this method variation is used in combination with the feature of adding to the cleaning fluid used in the cleaning process part of the permeate resulting during membrane filtration and containing the washing agents.

In accordance with an additional concept of the invention, a system of the type mentioned at the outset is designed for accomplishing the above-mentioned object such that the cleaning fluid line leads to a membrane filter apparatus which is connected with the vaporizer via a permeate line for transferring to the vaporizer the permeate generated by the membrane filter apparatus, that the distillate line is connected with the rinsing apparatus and that a region of concentrate in the vaporizer is connected with the cleaning apparatus via a concentrate line. The region of concentrate in the vaporizer will normally be a lower region of the vaporizer in which the residues remaining after distillation are collected.

Since a membrane filter apparatus is more highly efficient when the fluid to be cleaned is circulated in the circuit past the membrane, an embodiment of the inventive system is recommended, in which the cleaning fluid line connects the cleaning apparatus with a cleaning fluid collecting tank and the latter and the membrane filter apparatus are joined together to form a circuit including a pump via a supply line and a return line. The cleaning fluid collecting tank is then appropriately designed as an oil separator which comprises an oil region and a clean fluid region, the supply line being connected to the latter. As already mentioned, the collecting tank than fulfills a dual purpose since, on the one hand, it supplies the circuit mentioned above and, on the other hand, effects a preliminary cleaning of the fluid to be processed.

It is, in addition, recommended that the system be designed such that the distillate line includes at least one heat exchanger which heats the rinsing and/or cleaning fluid directly or via a heat carrier fluid and at least one additional heat exchanger so as to use the energy expended for the vaporizer in a more favourable manner.

A slurry is deposited in the oil separator and this is intended to be concentrated further prior to discharge. For this reason, in a preferred embodiment of the inventive system a lower zone of the clean fluid region of the oil separator is connected with the vaporizer via a discharge line. If this discharge line includes a valve, possibly even a pump, the slurry can be fed to the vaporizer in batches.

Furthermore, it is advantageous for the membrane filter apparatus to be connected with the cleaning apparatus via a permeate line provided with a valve so that part of the permeate, with the washing agents contained therein, is supplied directly to the cleaning apparatus again and the degree of soiling of the cleaning fluid therein is reduced without the entire permeate having to be distilled and the energy required for this expended.

DESCRIPTION OF THE DRAWING

Additional features, advantages and details of the invention result from the following description as well as the attached schematic illustration of a preferred embodiment of the inventive system.

DETAILED DESCRIPTION OF THE INVENTION

The system illustrated schematically in the attached drawing comprises a cleaning apparatus 10 and a rinsing apparatus 12 which are both illustrated as baths but can also have any other shape known from the state of the art. For the sake of simplicity, the jets and spray nozzles normally found in such cleaning and rinsing apparatuses have been omitted. The objects to be cleaned, e.g. machined metallic workpieces, which have become soiled during machining with oily substances and dirt, are first cleaned in the cleaning apparatus 10 and then rinsed in the rinsing apparatus 12. As shown in the above description, a system of this type can, of course, comprise a plurality of cleaning apparatuses and a plurality of rinsing apparatuses which, in the same manner as in the known system described at the outset, are connected in series one after the other for the objects to be treated to pass therethrough. In the cleaning apparatus 10 the objects are treated with an aqueous cleaning fluid which contains washing agents in order to wash the impurities, including oils and greases, from these objects, whereupon the cleaned objects pass into the rinsing apparatus 12 so that, above all, the washing agents can be rinsed off, but also the residual dirt particles still remaining on the objects. The bath tanks illustrated in the drawing are, in practice, provided at their bases with drainage lines for the purpose of withdrawing slurries or other sediments from the bases of the bath tanks and possibly reprocessing them.

The rinsing apparatus 12 is connected with the cleaning apparatus 10 via a rinsing fluid line 14. This rinsing fluid line is intended to be an overflow line for the rinsing apparatus, as schematically illustrated in the drawing. This means that a predetermined level of rinsing fluid can be maintained in the rinsing apparatus 12 irrespective of the fluid supplied to the rinsing bath.

In the same manner, the cleaning apparatus 10 is provided with an overflow to which a cleaning fluid drainage line 16 is connected. The emulsion resulting during cleaning of the objects to be treated and consisting of cleaning fluid and washed off oily and greasy impurities flows off from the bath tank of the cleaning apparatus 10 via this line. In order, if necessary, to be able to process rinsing fluid directly without it first being used in the cleaning process, the overflow of the rinsing apparatus 12 and its base are provided with rinsing fluid lines 14a and 14b, respectively, which open into the outlet line and comprise adjustable valves. The outlet line 16 opens into the upper region of an oil separator 18 which has an oil region 18a and a clean fluid region 18b which can be separated from one another by a partition wall 18c leaving a passage at the bottom. In this way, the oily impurities swimming on top of the cleaning fluid may be collected in the oil separator 18 in the top of the oil region 18a. From here they can be drawn off from the oil separator 18 via an overflow and an oil line 18d. According to the invention, a supply line 20a is connected to the base of the clean fluid region 18b and this line leads to a membrane filter apparatus 22 which contains a microfiltration or ultrafiltration membrane which is not illustrated. A return line 20b leads from this filter apparatus 22 into the upper part of the clean fluid region 18b of the oil separator 18 so that the latter forms a filtration circuit 24 together with the supply line 20a, the filter apparatus 22 and the return line 20b. In order to be able to circulate the cleaning fluid, which has been cleaned to a large extent of oily impurities in the oil separator 18, in the filtration circuit 24, the supply line 20a contains a pump 20c. The cleaning fluid still containing residual oil as well as washing agents is conducted through the filtration circuit 24 and in the filter apparatus 22 past the inflow side of the filtration membrane which is not illustrated. Water and the washing agents which have a low molecular concentration can hereby pass through the membrane so that a permeate is formed in the filter apparatus 22. In order to be able to draw this off from the filter apparatus 22, first and second permeate lines 26 and 28, respectively, lead away from this apparatus and the throughput of these lines can be controlled with valves. The permeate line 26 opens into a vaporizer 30 in which the permeate, which is free of oil thanks to the filtration, is heated by a heater 30a and partially vaporized. The permeate still contains washing agents but there is no transition of these agents into the vapor phase in the vaporizer 30 and they therefore become enriched in the concentrate remaining in the vaporizer 30. This is drawn off from a lower region of the vaporizer 30, namely a concentrate region 30b, via a concentrate line 32. The concentrate containing the washing agents and the permeate drawn off via the line 28 are fed into the cleaning apparatus 10 via the lines 32 and 28 (for the sake of simplicity, a pump which is possibly required for this has not been illustrated). Permeate is, however, fed via the permeate line 28 into the cleaning apparatus 10 only when a relatively high purity of the cleaning fluid in the cleaning apparatus 10 is desired. For this reason, the permeate lines 26 and 28 are provided with the aforementioned valves.

A vapor line 40 leads away from the upper region of the vaporizer 30 and this is fed with more or less pure water vapor by the vaporizer. The vapor line 40 leads to a heat exchanger 42, in which the water vapor condenses. The heat thereby resulting is used in a manner not illustrated in more detail for heating the rinsing fluid in the rinsing apparatus 12 and for heating the cleaning fluid in the cleaning apparatus 10. For this purpose, the bath tanks of these two apparatuses can be provided with heat exchangers which are connected with the heat exchanger 42 via heat carrier fluid lines.

A distillate line 46 leads from the heat exchanger 42 to the rinsing apparatus 12. The distillate condensed in the heat exchanger 42, i.e. more or less pure water, is conveyed through this line to the rinsing apparatus 12. A pump contained in the distillate line 46 has been designated as 46a. In a modified embodiment, the distillate line 46 could also be connected with the two apparatuses 10 and 12 via branch lines provided with valves.

A slurry-like sediment collects in the oil separator 18 and this can be supplied in batches via a discharge line 50 to the vaporizer 30 in order to thicken it and feed washing agents contained therein back to the circuit via the concentrate line 32. A pump contained in the discharge line 50 has been designated as 50a. The vaporizer has a discharge line 30c in its base for removal of the thickened slurry.

In principle, it would, of course, also be possible, for regenerating the rinsing fluid used in the rinsing apparatus 12, to supply this rinsing fluid to a preparation process not via the cleaning apparatus 10 but directly. This preparation could consist of separating out oil and/or cleaning by distillation. The lines 14a and/or 14b can be used for such a method; the line 14 can in this case be omitted.

Furthermore, the heat exchanger 42 could already be one or more heat exchangers which are installed in the cleaning apparatus 10 and/or the rinsing apparatus 12.

Finally, an outlet line 46b branches off the distillate line 46 and is used to drain off the distillate into a waste water pipe when slurry originating from the oil separator 18 is thickened in the vaporizer.

What is claimed is:

1. A system for cleaning objects to remove impurities by an aqueous cleaning fluid containing a washing agent and by rinsing said objects with an aqueous rinsing fluid after treatment of said objects with the cleaning fluid, said system comprising:
    (a) at least one cleaning apparatus (10) for treatment of the objects with said cleaning fluid;
    (b) at least one rinsing apparatus (12) for rinsing the objects with said rinsing fluid after the objects are cleaned;
    (c) a membrane filter apparatus (22) for separating at least some of said impurities from at least a portion of said fluids thereby obtaining a cleaned permeate fluid at a permeate outlet of said filter apparatus as well as a rejects fluid at a rejects outlet of said filter apparatus;
    (d) first feed line means (14,16,24) connecting at least one of said cleaning apparatus (10) and said rinsing apparatus (12) with an inlet of said membrane filter apparatus for feeding at least a portion of one of said fluids to said membrane filter apparatus;
    (e) a vaporizer (30) including heating means (30a) for distilling at least a portion of said permeate fluid thereby obtaining a cleaned distillate fluid at a distillate outlet and a concentrate fluid comprising at least a portion of said washing agent at a concentrate outlet of said vaporizer;
    (f) second feed line means (26) connecting said permeate outlet with said vaporizer for feeding at least a portion of said cleaned permeate fluid to said vaporizer;
    (g) first return line means (40,46) connecting said distillate outlet with said rinsing apparatus (12) for adding at least a portion of said cleaned distillate fluid to said rinsing fluid, and
    (h) second return line means (32) connecting said concentrate outlet with said cleaning apparatus (10) for adding at least a portion of said concentrate fluid with said washing agent portion to said cleaning fluid to be used in said cleaning apparatus.

2. The system as claimed in claim 1, having third feed line means (14) connecting said rinsing apparatus (12) with said cleaning apparatus (10) for adding at least a portion of said rinsing fluid to said cleaning fluid.

3. The system as claimed in claim 1, wherein said cleaning apparatus (10) is connected with said membrane filter apparatus (22) by said first feed line means.

4. The system as claimed in claim 15, wherein said first feed line means comprises a cleaning fluid collecting tank (18) and cleaning fluid circulating means (20c,20a,20b), said tank having a first tank inlet for receiving said cleaning fluid from the cleaning apparatus, a tank outlet for cleaning fluid collected in said tank and a second tank inlet for receiving said rejects fluid, and said circulating means comprising a first fluid line (20a) connecting said tank outlet with said inlet of the filter apparatus (22) and a second fluid line (20b) connecting said rejects outlet of the filter apparatus with said second tank inlet.

5. The system as claimed in claim 4, wherein said cleaning fluid circulating means comprises a pump (20c) in at least one of said first and second fluid lines.

6. The system as claimed in claim 4, wherein said tank comprises an oil separator (18) having an oil region (18a) and a cleaned fluid region (18b), said first tank inlet communicating with said oil region and said tank outlet and said second tank inlet communicating with said cleaned fluid region.

7. The system as claimed in claim 6, wherein said tank has a bottom region having a second tank outlet and wherein said vaporizer has a bottom region having a waste outlet (30c), said bottom region of the tank and said vaporizer being interconnected by a third fluid line (50) for feeding a sediment collected in said tank bottom region into the vaporizer.

8. The system as claimed in claim 1, wherein said first return line means (40,46) comprises a heat exchanger (42) for heating at least one of said cleaning fluid and said rinsing fluid to be used in the cleaning apparatus and the rinsing apparatus, respectively.

9. The system as claimed in claim 1, having third return line means (28) connecting said permeate outlet of the filter apparatus (22) with the cleaning apparatus (10), said third return line means comprising a valve for controlling the portion of said cleaned permeate fluid to be added to the cleaning fluid to be used in said cleaning apparatus.

* * * * *

UNITED STATES PATENT AND TRADEMARK OFFICE
CERTIFICATE OF CORRECTION

PATENT NO. : 5 174 315
DATED : December 29, 1992
INVENTOR(S) : Rüdiger Hellstern, et al It is certified that error appears in the above-identified patent and that said Letters Patent is hereby corrected as shown below:

Column 7, line 4; replace "Claim 15" with ---Claim 3---.

Signed and Sealed this

Second Day of November, 1993

Attest:

BRUCE LEHMAN

Attesting Officer     Commissioner of Patents and Trademarks